US010717487B2

(12) United States Patent
Lin et al.

(10) Patent No.: US 10,717,487 B2
(45) Date of Patent: Jul. 21, 2020

(54) FENDER ASSEMBLY AND VEHICLE INCLUDING THEREOF

(71) Applicant: Gogoro Inc., Hong Kong (CN)

(72) Inventors: Hsiu-Huang Lin, Changhua (TW); Chia-Hao Chang, New Taipei (TW)

(73) Assignee: Gogoro Inc., Hong Kong (CN)

( * ) Notice: Subject to any disclaimer, the term of this patent is extended or adjusted under 35 U.S.C. 154(b) by 0 days.

(21) Appl. No.: 15/987,530

(22) Filed: May 23, 2018

(65) Prior Publication Data

US 2018/0339742 A1 Nov. 29, 2018

Related U.S. Application Data

(60) Provisional application No. 62/510,184, filed on May 23, 2017.

(51) Int. Cl.
*B62D 25/18* (2006.01)
*B62J 15/02* (2006.01)
(Continued)

(52) U.S. Cl.
CPC .............. *B62J 15/02* (2013.01); *B60R 7/043* (2013.01); *B62D 25/163* (2013.01); *B62D 25/18* (2013.01); *B62J 15/00* (2013.01); *B62K 2202/00* (2013.01)

(58) Field of Classification Search
CPC .......... B62J 15/00; B62J 15/02; B62D 25/18; B62D 25/16; B62D 25/163; B62D 25/182; B60R 7/00; B60R 7/043
See application file for complete search history.

(56) References Cited

U.S. PATENT DOCUMENTS 3,625,405 A * 12/1971 Kezar ................. B62J 9/00
                                                   224/413
4,449,602 A *  5/1984 Dittmann, Jr. ......... B62K 5/06
                                                   180/215
(Continued)

FOREIGN PATENT DOCUMENTS

CN        2889850 Y     4/2007
CN      203419210 U     2/2014
TW         1477418      3/2015

OTHER PUBLICATIONS

Office Action received for Taiwanese Application No. TW107117610, Applicant: Gogoro Inc., dated Jul. 22, 2019, 5 pages.
(Continued)

*Primary Examiner* — James M Dolak
(74) *Attorney, Agent, or Firm* — Perkins Coie LLP

(57) ABSTRACT

A vehicle includes a fender, a storage compartment, and a first retaining wall. The fender has an inner surface, an outer surface, and a through hole connecting the inner surface and the outer surface. The storage compartment has a bottom plate. The bottom plate of the storage compartment is located at a side of the outer surface of the fender and at least covers the through hole. The fender is located below the storage compartment in a top-bottom direction of the vehicle. The first retaining wall is disposed on the outer surface of the fender and surrounds at least a portion of the through. A portion of the first retaining wall is closer to a front of the vehicle than the through hole in a front-rear direction of the vehicle.

12 Claims, 8 Drawing Sheets

(51) Int. Cl.
  *B60R 7/04* (2006.01)
  *B62D 25/16* (2006.01)
  *B62J 15/00* (2006.01)

(56) References Cited

U.S. PATENT DOCUMENTS

| | | | | |
|---|---|---|---|---|
| 4,679,647 A * | 7/1987 | Komuro | ............... | B62J 1/12 |
| | | | | 180/219 |
| 4,800,980 A * | 1/1989 | Hideo | ............... | B62J 7/04 |
| | | | | 180/225 |
| 4,802,682 A * | 2/1989 | Yasuji | ............... | B62J 11/005 |
| | | | | 180/219 |
| 4,964,483 A * | 10/1990 | Yokoyama | ............... | B62J 35/00 |
| | | | | 180/219 |
| 5,060,748 A * | 10/1991 | Iwai | ............... | B62K 19/46 |
| | | | | 180/215 |
| 5,064,016 A * | 11/1991 | Iwai | ............... | B62K 19/46 |
| | | | | 180/215 |
| 5,127,561 A * | 7/1992 | Miyamoto | ............... | B62J 35/00 |
| | | | | 224/413 |
| 5,433,286 A * | 7/1995 | Kumamaru | ............... | B62K 11/10 |
| | | | | 180/219 |
| 6,581,709 B2 * | 6/2003 | Tsuji | ............... | B62K 11/14 |
| | | | | 180/90 |
| 6,651,767 B2 * | 11/2003 | Izawa | ............... | B62J 11/005 |
| | | | | 180/219 |
| 6,719,346 B2 * | 4/2004 | Bettin | ............... | B60R 9/02 |
| | | | | 296/183.1 |
| 6,729,516 B2 * | 5/2004 | Hanagan | ............... | B62J 9/001 |
| | | | | 224/419 |
| 6,966,593 B2 * | 11/2005 | Plentis | ............... | B60R 9/02 |
| | | | | 224/402 |
| 7,216,912 B2 * | 5/2007 | Takeshima | ............... | B62K 19/46 |
| | | | | 224/544 |
| 7,503,609 B2 * | 3/2009 | Misaki | ............... | B62J 9/00 |
| | | | | 296/37.1 |
| 7,828,102 B2 * | 11/2010 | Yano | ............... | B62J 1/12 |
| | | | | 180/219 |
| 8,100,214 B2 * | 1/2012 | Pueffel | ............... | B62K 19/46 |
| | | | | 180/219 |
| 8,864,157 B2 * | 10/2014 | Tsutsui | ............... | B62J 6/18 |
| | | | | 280/152.1 |
| 8,960,753 B2 * | 2/2015 | Horiuchi | ............... | B60R 7/06 |
| | | | | 296/37.1 |

OTHER PUBLICATIONS

Office Action received for co-pending Chinese Application No. 201810500610.6; Applicant: Gogoro Inc., dated Sep. 25, 2019, 6 pages.

* cited by examiner

FENDER ASSEMBLY AND VEHICLE INCLUDING THEREOF

CROSS-REFERENCE TO RELATED APPLICATION

This application claims priority to U.S. Provisional Application Ser. No. 62/510,184, filed May 23, 2017, which is herein incorporated by reference.

BACKGROUND

The present invention relates to a fender assembly. More particularly, the present invention relates to a vehicle including a fender assembly.

DESCRIPTION OF RELATED ART

Motorcycles are now common vehicles for transportations due to their advantages on high mobility. In general, when the motorcycle is passing a pond, water will be driven by the wheel due to an inertial rotation of wheel during its operation, and water will be splashed toward an interior of the motorcycle. In order to prevent the parts inside the motorcycle from being damaged by the splash of water, the motorcycle usually contains a fender. The fender is usually disposed at a side of the front or rear of the motorcycle facing the main body thereof to prevent water from splashing the interior of the motorcycle thereby protecting the parts inside of it.

SUMMARY

The present disclosure provides a vehicle. The vehicle includes a fender, a storage compartment, and a first retaining wall. The fender has an inner surface, an outer surface, and a through hole connecting the inner surface and the outer surface. The storage compartment has a bottom plate. The bottom plate of the storage compartment is located at a side of the outer surface of the fender and at least covers the through hole. The fender is located below the storage compartment in a top-bottom direction of the vehicle. The first retaining wall is disposed on the outer surface of the fender and surrounds at least a portion of the through hole. A portion of the first retaining wall is closer to a front of the vehicle than the through hole of the fender in a front-rear direction of the vehicle.

In some embodiments of the present disclosure, the through hole is located at a portion of the fender which is closest to the storage compartment.

In some embodiments of the present disclosure, the through hole of the fender is a long slot. The long slot has first and second long borderlines. The first and second long borderlines both substantially extend in the front-rear direction. A side of the first long borderline away from the second long borderline is defined as a first side. Another side of the second long borderline away from the first long borderline is defined as a second side. The first retaining wall extends from the first side to the second side.

In some embodiments of the present disclosure, the first retaining wall includes first and second extending portions connected to each other. The first extending portion is disposed on the first side of the fender. The second extending portion extends from the first side to the second side of the fender and is closer to the front of the vehicle than the through hole of the fender.

In some embodiments of the present disclosure, the second extending portion gradually approaches a bottom of the vehicle from the first side to the second side of the fender in the top-bottom direction.

In some embodiments of the present disclosure, the long slot has first and second terminals. The first and second terminals are located at opposite ends thereof respectively and each is disposed between the first and second long borderlines thereof. The first terminal of the long slot is closer to the front of the vehicle than the second terminal of the long slot. The fender has a lower edge near the first terminal of the long slot and away from the second terminal of the long slot. The second extending portion of the first retaining wall is disposed between the long slot and the lower edge of the fender.

In some embodiments of the present disclosure, the vehicle further includes a second retaining wall. The second retaining wall is disposed on the outer surface of the fender and is located at the second side of the fender.

In some embodiments of the present disclosure, the first retaining wall further includes a third extending portion. The third extending portion is connected to an end of the second extending portion opposite to the first extending portion, extends to the front of the vehicle in the front-rear direction, and forms a shrinking structure with the second retaining wall at the second side of the fender. The shrinking structure is closer to a bottom of the vehicle than the through hole of the fender in the top-bottom direction.

The invention further provides a fender assembly. The fender assembly includes a fender, a lid, and a first retaining wall. The fender has an inner surface, an outer surface, and a through hole connected the inner surface to the outer surface. The lid is located at a side of the outer surface and at least covers the through hole of the fender. The first retaining wall is disposed on the outer surface and surrounds at least a portion of the through hole of the fender.

In some embodiments of the present disclosure, the inner surface of the fender recesses toward the outer surface to form a recessing space. The through hole is located at a bottom of the recessing space away from an outer edge of the fender.

In some embodiments of the present disclosure, the through hole of the fender is a long slot. The long slot has first and second long borderlines. A side of the first long borderline away from the second long borderline is defined as a first side. Another side of the second long borderline away from the first long borderline is defined as a second side. The first retaining wall extends from the first side to the second side of the fender.

In some embodiments of the present disclosure, the first retaining wall includes first and second extending portions connected to each other. The first extending portion is disposed on the first side of the fender. The second extending portion extends from the first side to the second side of the fender.

In some embodiments of the present disclosure, the long slot has first and second terminals. The first and second terminals are located at opposite ends thereof respectively and each is disposed between the first and second long borderlines thereof. The fender has a lower edge near the first terminal and away from the second terminal. The second extending portion of the first retaining wall is disposed between the long slot and the lower edge.

In some embodiments of the present disclosure, the vehicle further includes a second retaining wall. The second retaining wall is disposed on the outer surface of the fender and is located at a second side of the fender.

In some embodiments of the present disclosure, the first retaining wall further includes a third extending portion. The third extending portion is connected to an end of the second extending portion opposite to the first extending portion and is formed a shrinking structure with the second retaining wall at the second side of the fender.

In some embodiments of the present disclosure, the lid, the outer surface of the fender, and the first and second retaining walls form a flow channel.

In some embodiments of the present disclosure, the fender includes a first engaging protrusion. The first engaging protrusion is connected to a periphery of the through hole thereof. The lid includes a second engaging protrusion. The second engaging protrusion surrounds at least a part of the first engaging protrusion to join with the fender.

In some embodiments of the present disclosure, the vehicle further includes a bonding material. The bonding material is disposed between the first engaging protrusion and the second engaging protrusion.

In some embodiments of the present disclosure, the lid further includes a third engaging protrusion to define a groove with the second engaging protrusion. The first engaging protrusion of the fender is protruded in the groove.

In some embodiments of the present disclosure, the first engaging protrusion is embedded in the groove.

In the aforementioned configurations, the fender assembly is able to prevent water from splashing interior components of the vehicle 1 and from causing damage to related components. Specifically, the through hole of the fender allows the rear wheel of the vehicle to partially pass through the fender via it, thereby enabling the rear wheel to increase its radial size. On the other hand, when the vehicle is in a running state, the rear wheel movably protrudes from the through hole in a direction toward the bottom plate, or leaves the through hole in a direction away from the bottom plate without colliding or rubbing against the fender, so as to avoid instability of the vehicle during operation. Furthermore, through the arrangement of the through hole, the spaces on both sides of the fender is able to be connected, so as to extend a space adjacent to a side of the inner surface to another space adjacent to a side adjacent to the outer surface, such that the tolerance of components disposed in the space is able to be increase. For example, in the case where the through hole is provided in the fender, the selection of the size or shape of the rear wheel and the selection of the size or capability of the shock absorber (not shown) adjacent to the rear wheel of the vehicle will thus increase compared to the case where the fender is not provided with a through hole.

Moreover, when water is thrown by a centrifugal force of the rear wheel of the vehicle toward the fender, a part of water will be stop at the inner surface of the fender, and another part of water will pass through the through hole of the fender to the limiting space. Then, water in the limiting space is blocked by the surrounding second engaging protrusion, the first engaging protrusion, the third engaging protrusion, and/or the bottom plate of the storage compartment, and thus will at least partially flow back through the through hole to a side adjacent to the inner surface of the fender to limit water leakage to the channel. However, even if wafer flows through the second engaging protrusion, the first engaging protrusion, and the third engaging protrusion to the channel, the passing water is guided by the first retaining wall and/or the second retaining wall and exhaust channel from the diversion opening, thereby preventing water from splashing interior components of the vehicle and from causing damage to related components.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
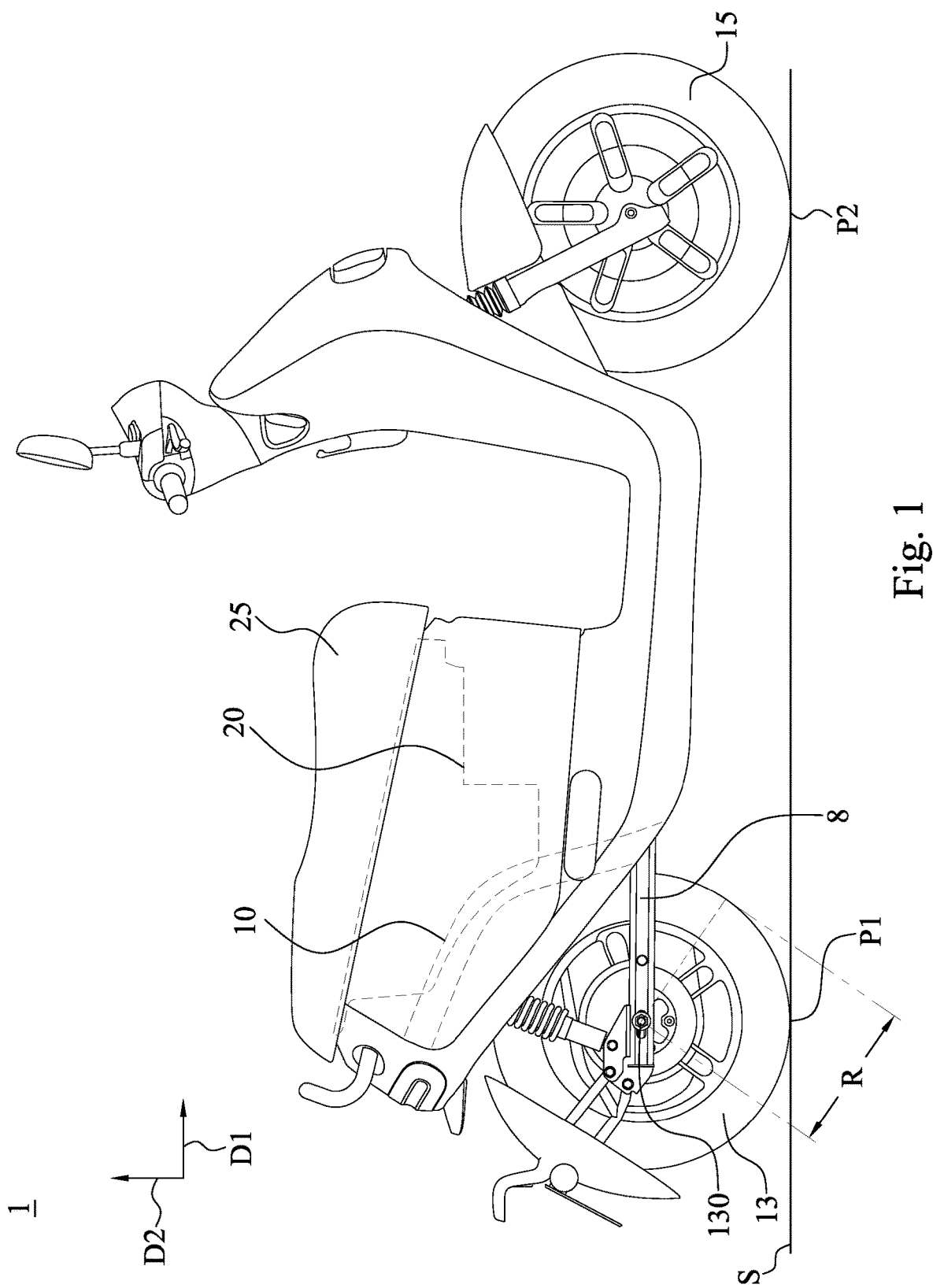
FIG. 1 is a side view of a vehicle in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
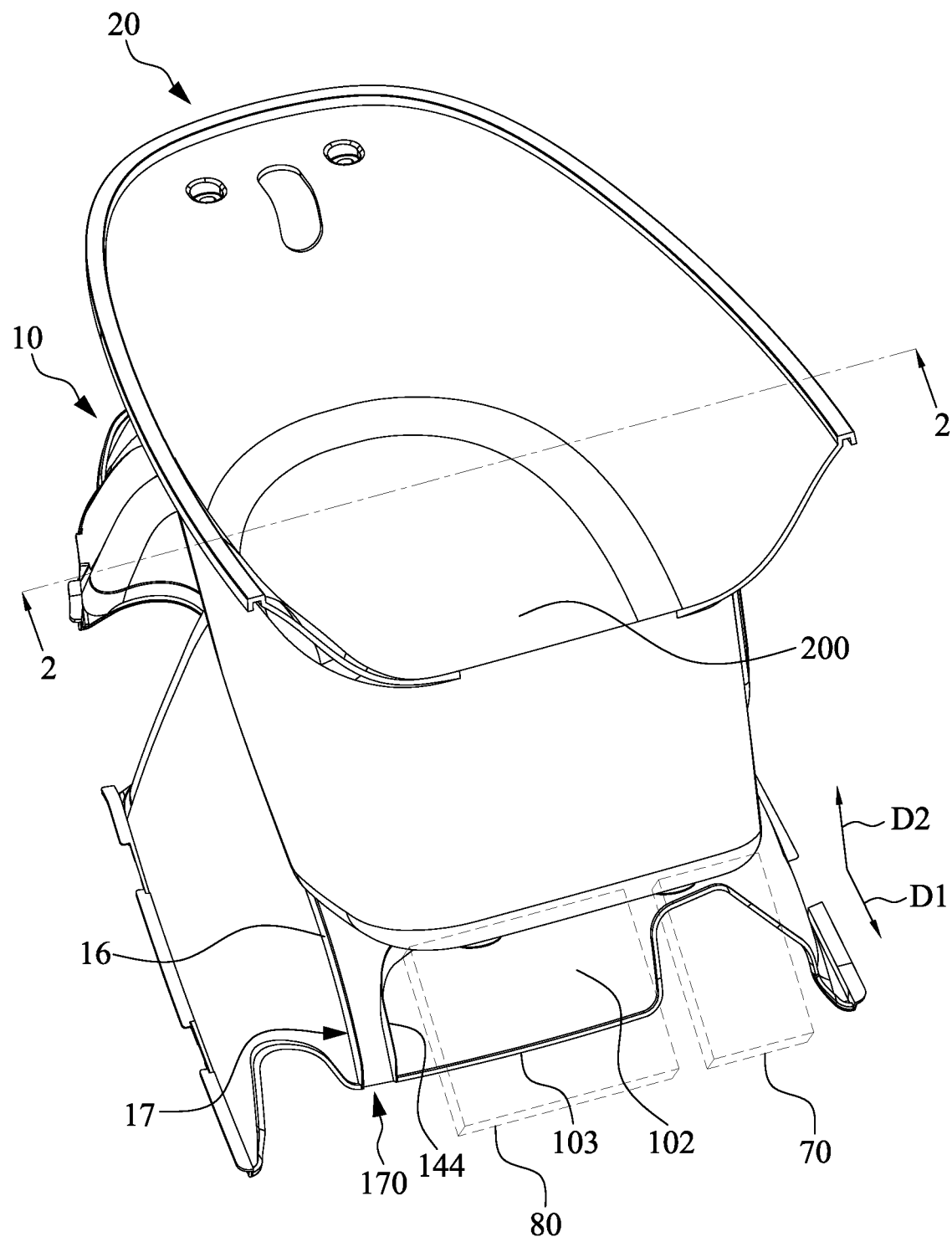
FIG. 2 is a perspective view of a storage compartment and a fender of the vehicle in accordance with some embodiments of the present disclosure.

Reference is made to FIGS. 1 and 2. FIG. 1 is a side view of a vehicle 1 in accordance with some embodiments of the present disclosure. FIG. 2 is a perspective view of a storage compartment 20 and a fender 10 of the vehicle 1 in accordance with some embodiments of the present disclosure. In the embodiment, for ease of explanation, a front-rear direction and a top-bottom direction of the vehicle 1 are defined. Specifically, the vehicle 1 includes a rear wheel 13 and a front wheel 15. When the vehicle 1 is placed on the surface S, the rear wheel 13 and the front wheel 15 of the vehicle 1 contact the surface S with the first contacting point P1 and the second contacting point P2 located thereon, respectively.

An extending direction of a line connecting the first contacting point P1 and the second contacting point P2 is defined as the front-rear direction D1 of the vehicle 1. A top-bottom direction D2 of the vehicle 1 is substantially perpendicular to the front-rear direction D1. The vehicle 1 is configured to move on the surface S, such as a road surface on a street, in the front-rear direction D1 of the vehicle 1, and includes a main frame 8 (see FIG. 1), the fender 10, the storage compartment 20, a seat cushion 25 (see FIG. 1), a first retaining wall 14 (see FIG. 3), and a second retaining wall 16 (see FIG. 2). The structure and function of the components and their relationships are described in detail hereinafter.

In FIGS. 1 and 2, the main frame 8 of the vehicle 8 supports part of elements, such as fender 10, storage compartment 20, and seat cushion 25, in the vehicle 1. The vehicle 1 is configured to move on surface S by the rear wheel 13 and the front wheel 15. The seat cushion 25 of the vehicle 1 extends in the front-rear direction D1 and is suitable for the user to sit. The storage compartment 20 of the vehicle 1 is located below the seat cushion 25 in the top-bottom direction D2. The fender 10 of the vehicle 1 is disposed at a side of the rear wheel 13 toward an interior of the vehicle 1 and located between the rear wheel 13 and the storage compartment 20. The fender 10 has a lower edge 103 (see FIG. 2), an inner surface 100 (see FIG. 4), and an outer surface 102. The fender 10 of the vehicle 1 is located below the storage compartment 20 in the top-bottom direction D2. The inner surface 100 of the fender 10 faces toward the rear wheel 13. The outer surface 102 faces toward the storage compartment (see FIG. 2). The lower edge 103 is the edge of the fender 10 which is close to a front of the vehicle 1 in the front-rear direction D1 of the vehicle 1. The inner surface 100 of the fender 10 recess toward the outer surface 102 to form a recessing space 108 (see FIG. 4). For example, the fender 10 is an oval semi-open space and its recessing space 108 is adapted to receive a part of the rear wheel 13 of the vehicle 1.

Figure 3:
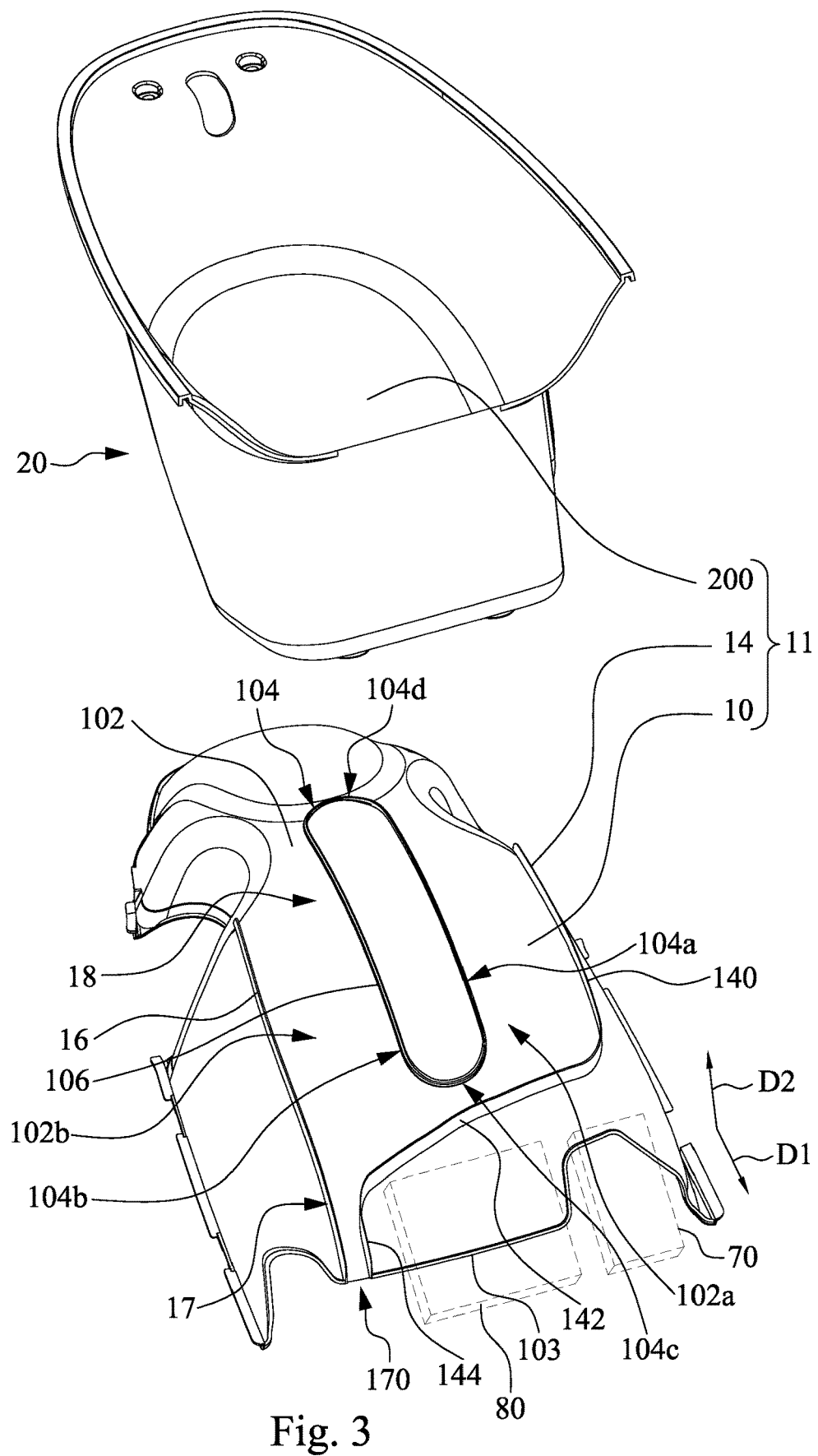
FIGS. 3 and 4 are exploded views of the storage compartment and the fender assembly of the vehicle in different views respectively in accordance with some embodiments of the present disclosure.

Reference is made to FIG. 3. FIG. 3 is an exploded view of the storage compartment 20 and a fender assembly 11 including the fender 10, the first retaining wall 14, and the second retaining wall 16 in accordance with some embodiments of the present disclosure. As shown in FIG. 3, the fender 10 has a through hole 104 and a first engaging protrusion 106. In the embodiment, the through hole 104 of the fender 10 is located in a center of a bottom of the recessing space 108 (see FIG. 4) and located at a bottom of the recessing space 108 away from an outer edge of the fender 10 and adapts to a surface of the rear wheel 13 to form a capsule shape. In the embodiment, the lower edge 103 is a part of said outer edge of the fender 10. Furthermore, the through hole 104 of the fender 10 is located at a portion of the fender 10 which is closest to the storage compartment 20 and between the rear wheel 13 and the storage compartment 20. In some embodiments, the fender 10, the first retaining wall (see FIG. 3), and any suitable lid (or a suitable bottom plate) in the vehicle 1 constitute at least a portion of the fender assembly 11. Said lid in the vehicle is located at a side of the outer surface 102 of the fender 10 and at least covers the through hole 104 of the fender 10. In some embodiments, the lid in the vehicle 1 completely covers the fender 10.

As shown in FIG. 3, the storage compartment 20 has a bottom plate (or a lid) 200 corresponding to a bottom thereof. The bottom plate 200 of the storage compartment 20 is located at a side of the outer surface 102 of the fender 10. In the embodiment, the bottom plate 200 of the storage compartment 20 is used as the lid in the fender assembly 11.

That is, the bottom plate 200 of the storage compartment 20, fender 10, and the first retaining wall 14 constitute at least a part of the fender assembly 11 of the present disclosure, but the present disclosure is not limited thereto. In some embodiments, the bottom plate 200 of the storage compartment 20 is integrally formed with the lid in the fender assembly 11. In some embodiments, any suitable element located in the vehicle 1 can be used as the lid in the present disclosure.

In the embodiment, the through hole 104 is a long, capsule-shaped slot located at a center of the recessing space 108 of the fender 10. The through hole 104 is connected the inner surface 100 (see FIG. 4) to the outer surface 102 of the fender 10. The long slot (i.e. through hole 104) of the fender 10 has a first borderline 104a, a second borderline 104b, and a first terminal 104c, and a second terminal 104d. The first terminal 104c and the second terminal 104d are located at opposite ends of the long slot respectively and each is disposed between the first long borderline 104a and the second long borderline 104b of the long slot. The first terminal 104c of the through hole 104 is closer to the front of the vehicle 1 than the second terminal 104d in the front-rear direction D1. Furthermore, the lower edge 103 is the edge adjacent to the first terminal 104c and away from the second terminal 104d on the fender 10. In the embodiment, the first long borderline 104a and the second long borderline 104b of the long slot are substantially parallel to each other and extend along the front-rear direction D1 of the vehicle, but the present disclosure is not limited thereto. In some embodiments, an extending line of the first long borderline 104a and an extending line of the second borderline 104b can intersect. In some embodiments, the first long borderline 104a and/or the second borderline 104b may be in the form of a curve. The bottom plate 200 of the storage compartment 20 at least covers the through hole 104 of the fender 10. In the embodiment, the bottom plate 200 of the storage compartment 20 completely covers the fender 10.

In the embodiment, the arrangement of the long slot (i.e. through hole 104) allows the rear wheel 13 (see FIG. 1) of the vehicle 1 to partially pass through the fender 10 via the long slot, thereby enabling the rear wheel 13 to increase its radial size. On the other hand, when the vehicle 1 is in a running state, the rear wheel 13 movably protrudes from the long slot (i.e. the through hole 104) in a direction toward the bottom plate 200, or leaves the long slot in a direction away from the bottom plate 200. Hence, when the vehicle 1 is driving on a bumpy road, the through hole 104 of the fender 10 is able to prevent the vehicle 1 from collision or friction between the rear wheel 13 and the fender 10, so as to avoid instability of the vehicle 1 during operation and to prevent the rear wheel 13 or the fender 10 from the damage. Therefore, the service life of the rear wheel 13 and the fender are able to be improved. In addition, through the arrangement of the through hole 104, the spaces on both sides of the fender 10 is able to be connected, so as to extend a space adjacent to a side of the inner surface 100 to another space adjacent to a side adjacent to the outer surface 102, such that the tolerance of components disposed in the space is able to be increase. For example, in the case where the through hole 104 is provided in the fender 10, the selection of the size or shape of the rear wheel 13 and the selection of the size or capability of the shock absorber (not shown) adjacent to the rear wheel 13 of the vehicle 1 will thus increase compared to the case where the fender 10 is not provided with a through hole.

For example, the rear wheel 13 has a rotating radius R. The rotation radius R is substantially equal to a distance between a rotating center axis 130 of the rear wheel 13 and an outer edge of the rear wheel 13. The rear wheel 13 of the vehicle (see FIG. 1) is able to protrude from the long slot (i.e. the through hole 104) in a direction toward the bottom plate 200. The rotating radius R of the rear wheel 13 is able to be larger than a distance between the fender 10 and the rotating center axis 130 of the rear wheel 13, and the rear wheel 13 and the fender 10 are spaced apart from each other.

In FIG. 3, a side of the first long borderline 104a of the long slot (i.e. through hole 104) away from the second long borderline 104b is defined as a first side 102a. A side of the second long borderline 104b of the long slot away from the first long borderline 10ab is defined as a second side 102b.

In the embodiment, the first retaining wall 14 is disposed on the outer surface 102 of the fender 10 and surrounds at least a portion of the through hole 104. A portion of the first retaining wall 14 is closer to the front of the vehicle than the through hole 104 of the fender 10 in a front-rear direction D1 of the vehicle 1. Specifically, the first retaining wall 14 includes a first extending portion 140, a second extending portion 142, and the third extending portion 144.

The first extending portion 140 of the first retaining wall 14 is located on the first side 102a, spaced apart from the through hole 104 by a distance, and extends toward the lower edge 103 substantially along the first borderline 104a of the through hole 104. The second extending portion 142 of the first retaining wall 14 is connected to an end of the first extending portion 140 adjacent to the lower edge 103, extends from the first side 102a to the second side 102b, and is closer to the front of the vehicle 1 than the through hole 104 of the fender 10. Furthermore, the second extending portion 142 of the first retaining wall 14 is disposed between the through hole 104 and the lower edge 103 and gradually approaches a bottom of the vehicle 1 from the first side 102a to the second side 102b of the fender 10 in the top-bottom direction D2. The third extending portion 144 of the first retaining wall 14 is located on the second side 102b of the fender 10 and is connected to an end of the second extending portion 142 opposite to the first extending portion 140. Furthermore, the third extending portion 144 of the first retaining wall 14 extends toward the front of the vehicle 1 in the front-rear direction D1 and further extends to the lower edge 103 of the fender 10.

In the embodiment, the first retaining wall 14 is integrally formed with the fender 10, but the present disclosure is not limited thereto. In some embodiments, the first retaining wall 14 is made of a material different from the fender 10. In some embodiments, the first retaining wall 14 is made of rubber or soft material, but the present disclosure is not limited thereto. In some embodiments, any suitable material can be used in this disclosure.

In FIG. 3, the second retaining wall 16 is disposed on the outer surface 102 of the fender 10, is located at the second side 102b of the fender 10, and forms a shrinking structure 17 with the first retaining wall 14 at the second side 102b of the fender 10. The shrinking structure 17 is closer to the bottom of the vehicle 1 than the through hole 104 of the fender 10 in the top-bottom direction D2 and forms a diversion opening 170 at the lower edge 103. Furthermore, a channel 18 forms between the second retaining wall 16, the first retaining wall 14, the bottom plate 200 of the storage compartment 20, and the outer surface 102 of the fender. That is, the bottom plate 200 of the storage compartment 20 covers the channel 18. The channel 18 is communicated to outside thereof through the diversion opening 170.

Hence, when the vehicle 1 runs on the surface S, water on the surface S is driven through the rear wheel 13 (see FIG. 1) of the vehicle 1 to pass through the through hole 104 of the fender 10, and then is able to be restricted to the channel 18. Then, water is guided through the first retaining wall 14 and the second retaining wall 16 to be further discharged outside the channel 18 through the diversion opening 170. Specifically, the position of the diversion opening 170 and the second extending portion 142 of the first retaining wall 14 is able to prevent water from flowing through components near a side of the lower edge 103. In some embodiments, the shrinking structure 17 is disposed at a position away from most components in the vehicle 1. For example, as shown in FIG. 3, the shrinking structure 17 is disposed at a position in the vehicle away from a power unit 70 (e.g., a motor) or other device 80 (e.g. a motor controller), but the present disclosure is not limited thereto. Since the second extending portion 142 gradually approaches the bottom of the vehicle 1 from the first side 102a to the second side 102b (i.e. in a direction toward the shrinking structure 17) of the fender 10 in the top-bottom direction D2, the second extending portion 142 of the first retaining wall 14 is able to direct water to flow to the necking area 17 located on the second side 102b of the fender 10, thus to direct water away from a side containing plural components, thereby preventing water from splashing interior components of the vehicle 1 and from causing damage to related components. However, the configuration of the first retaining wall 14 and the second retaining wall 16 is not limited thereto. In some embodiments, as long as the structural configuration that can guide water flow away from most of the components in the vehicle 1 is able to be applied to the present disclosure.

In the embodiment, the second retaining wall 16 is integrally formed with the fending 10, but the present disclosure is not limited thereto. In some embodiments, the second retaining wall 16 is made of a material different from the fender 10 and/or the first retaining wall 14. In some embodiments, the second retaining wall 16 is made of a material which is the same as that of the first retaining wall 14. In some embodiments, the second retaining wall 16 is made of rubber or soft material, but the present disclosure is not limited thereto. In some embodiments, any suitable material can be used in this disclosure.

Figure 4:
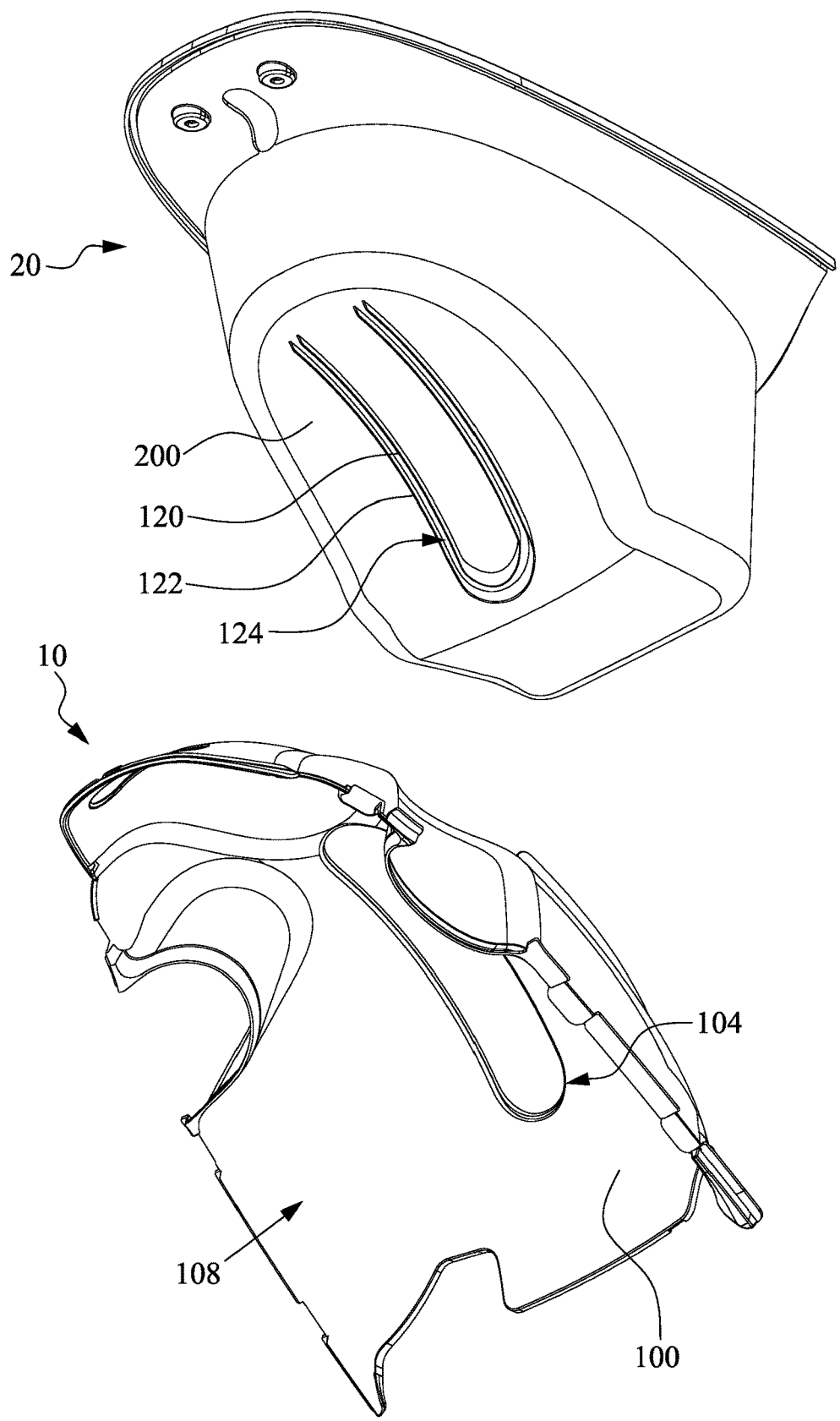
Figure 5:
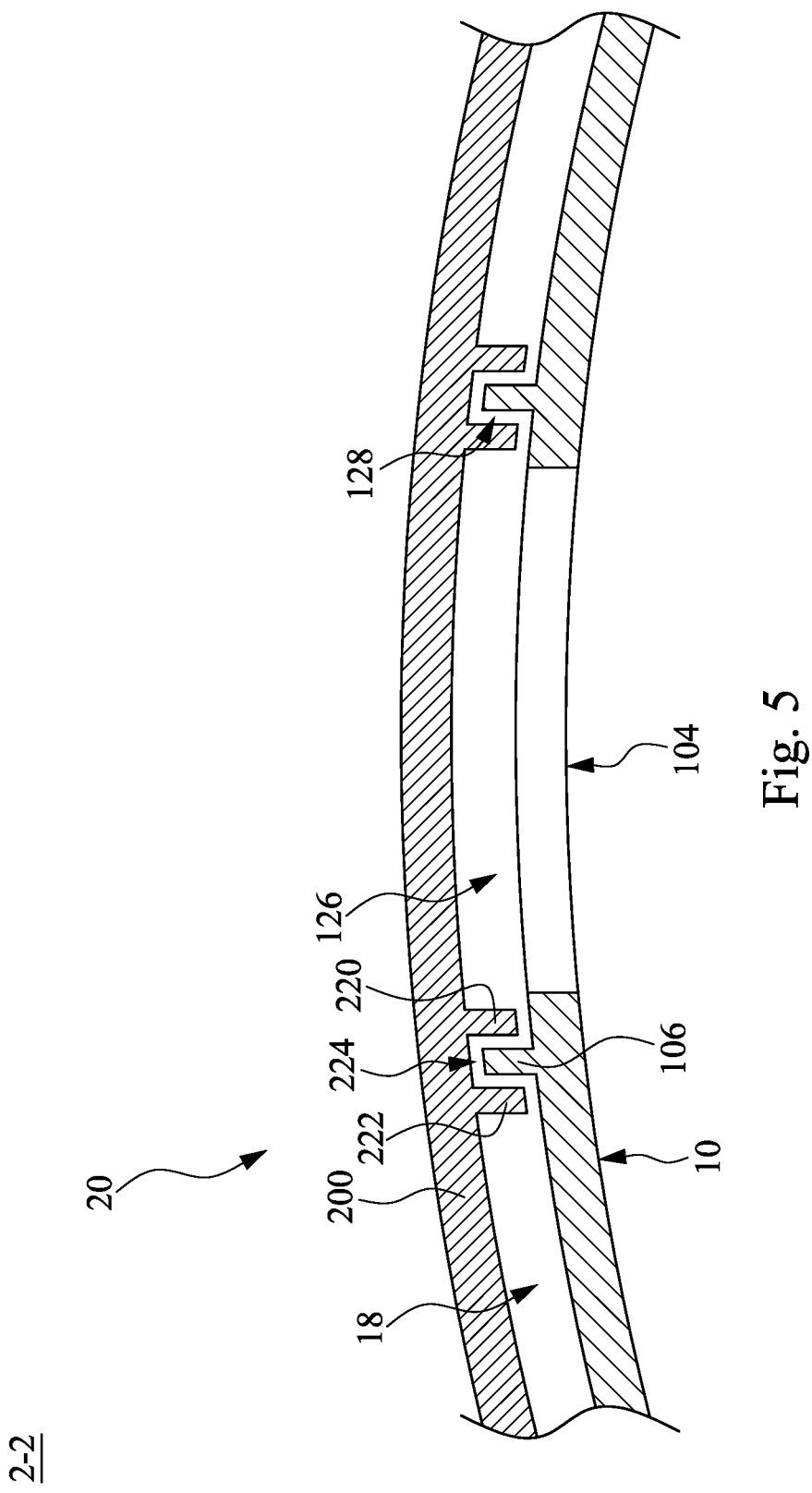
FIG. 5 is a cross section view along line 2-2 in FIG. 2.

Reference is made to FIGS. 4 and 5. FIG. 4 is an exploded view of the storage compartment 20, the fender 10, and first retaining wall 14 in a view different from that show in FIG. 2 in accordance with some embodiments of the present disclosure. FIG. 5 is a cross section view along line 2-2 in FIG. 2. As shown in FIGS. 4 and 5, the bottom plate 200 of the storage compartment 20 includes a second engaging protrusion 220 and a third engaging protrusion 222. In the embodiment, the first engaging protrusion 106 of the fender 10 (see FIG. 3) is connected to a periphery of the through hole 104 and protrudes toward the storage compartment 20. The second and third engaging protrusions 220, 222 of the bottom plate 200 of the storage compartment 20 protrude toward the fender 10 respectively and surround at least a portion of first engaging protrusion 106 to join with the fender 10.

Specifically, the third engaging protrusion 222, the second engaging protrusion 220, and a portion of a bottom surface of the bottom plate 200 define a groove 224 (see FIG. 5). An opening of the groove 224 faces toward the fender 10. The first engaging protrusion 106 of the fender 10 (see FIG. 5) protrudes into the groove 224 and is spaced apart from the second and third engaging protrusions 220, 222 by a gap 128 (see FIG. 5). In some embodiments, the first engaging protrusion 106 of the fender 10 is joined with the groove 224. Furthermore, the second engaging protrusion 220 (and/ or third engaging protrusion 222) forms a limiting space 126 (see FIG. 5) with the bottom plate 200 of the storage compartment 20. The limiting space 126 is communicated with a space adjacent to the inner surface 100 of the fender 10 through the through hole 104 of the fender 10.

Hence, when water is thrown by a centrifugal force of the rear wheel 13 (see FIG. 1) of the vehicle 1 toward the fender 10, a part of water will be stop at the inner surface 100 of the fender 10, and another part of water will pass through the through hole 104 of the fender 10 to the limiting space 126 (see FIG. 5). Then, water in the limiting space 126 is blocked by the surrounding second engaging protrusion 220, the first engaging protrusion 106, the third engaging protrusion 222, and/or the bottom plate 200 of the storage compartment, and thus will at least partially flow back through the through hole 104 to a side adjacent to the inner surface 100 of the fender 10 to limit water leakage to the channel 18. However, even if wafer flows through the second engaging protrusion 220, the first engaging protrusion 106, and the third engaging protrusion 222 to the channel 18, the passing water is guided by the first retaining wall 14 and/or the second retaining wall 16 and exhaust channel 18 from the diversion opening 170, thereby preventing water from splashing interior components of the vehicle 1 and from causing damage to related components.

Figure 6:
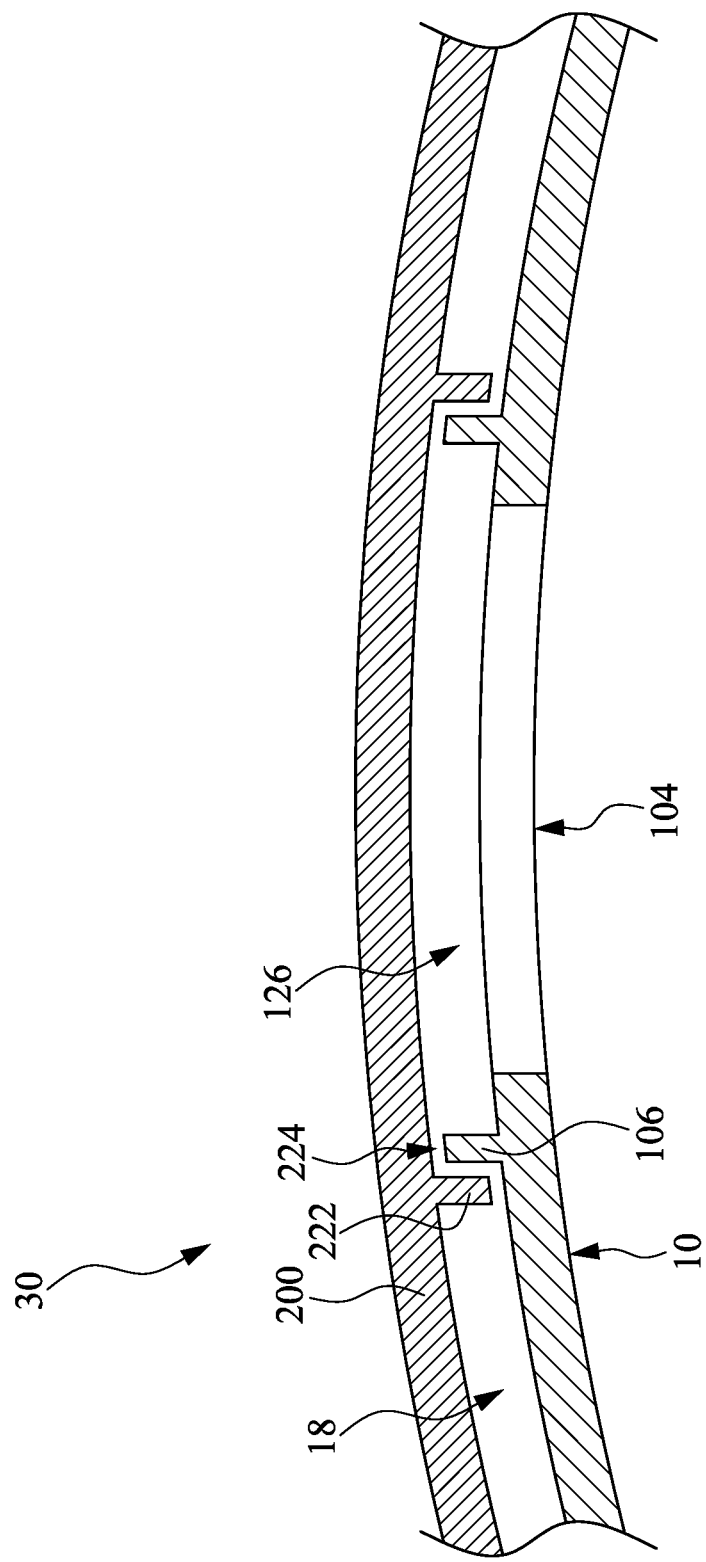
FIGS. 6, 7, and 8 each is a cross section view of a storage compartment and a fender assembly of another vehicle in accordance with some embodiments of the present disclosure.
Figure 7:
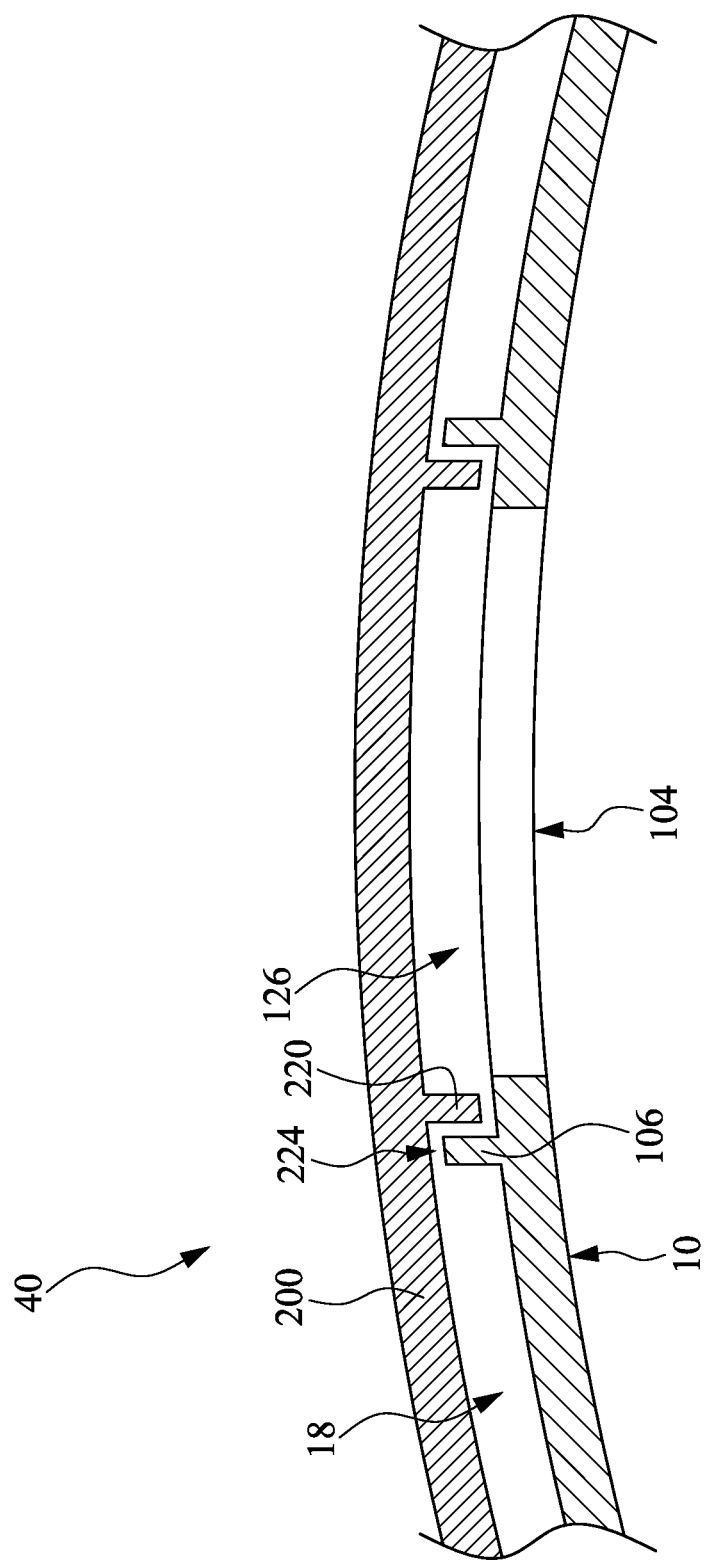

Reference is made to FIGS. 6 and 7. FIG. 6 is a cross section view of a storage compartment 30 and the fender assembly 11 of another vehicle in accordance with some embodiments of the present disclosure. FIG. 7 is cross section view of a storage compartment 40 and the fender assembly 11 of another vehicle in accordance with some embodiments of the present disclosure. In FIGS. 6 and 7, the structure and function of the elements and the relationship therebetween are substantially the same as the storage compartment 20 and the fender assembly 11 in FIG. 5, and the related detailed descriptions may refer to the foregoing paragraphs, and are not discussed again herein. It is noted that, the difference between the present embodiment and that in FIG. 5 is in that the storage 30 shown in FIG. 6 does not include the second engaging protrusion 220 shown in FIG. 5, and the storage compartment 40 shown in FIG. 7 does not include the third engaging protrusion 222 shown in FIG. 5.

In FIG. 6, the third engaging protrusion 222 of the bottom plate 200 of the storage compartment 20 is adjacent to the first engaging protrusion 106 of the fender 10. In FIG. 7, the second engaging protrusion 220 of the bottom plate 200 of the storage compartment 20 is adjacent to the first engaging protrusion 106 of the fender 10. Hence, when water is driven through the rear wheel 13 (see FIG. 1) of the vehicle 1 to pass from a side adjacent to the inner surface 100 to another side adjacent to the outer surface 102 of the fender 10, water is able to be restricted to the limiting space 126. Then, in FIG. 6, water is blocked by the third engaging protrusion 222 and the bottom plate 200 of the storage compartment, and thus at least partially flow back through the through hole 104 to a side adjacent to the inner surface 100 of the fender 10. Alternatively, in FIG. 6, water is blocked by the second engaging protrusion 220 and the bottom plate 200 of the storage compartment, and thus at least partially flow back through the through hole 104 to a side adjacent to the inner surface 100 of the fender 10.

Figure 8:
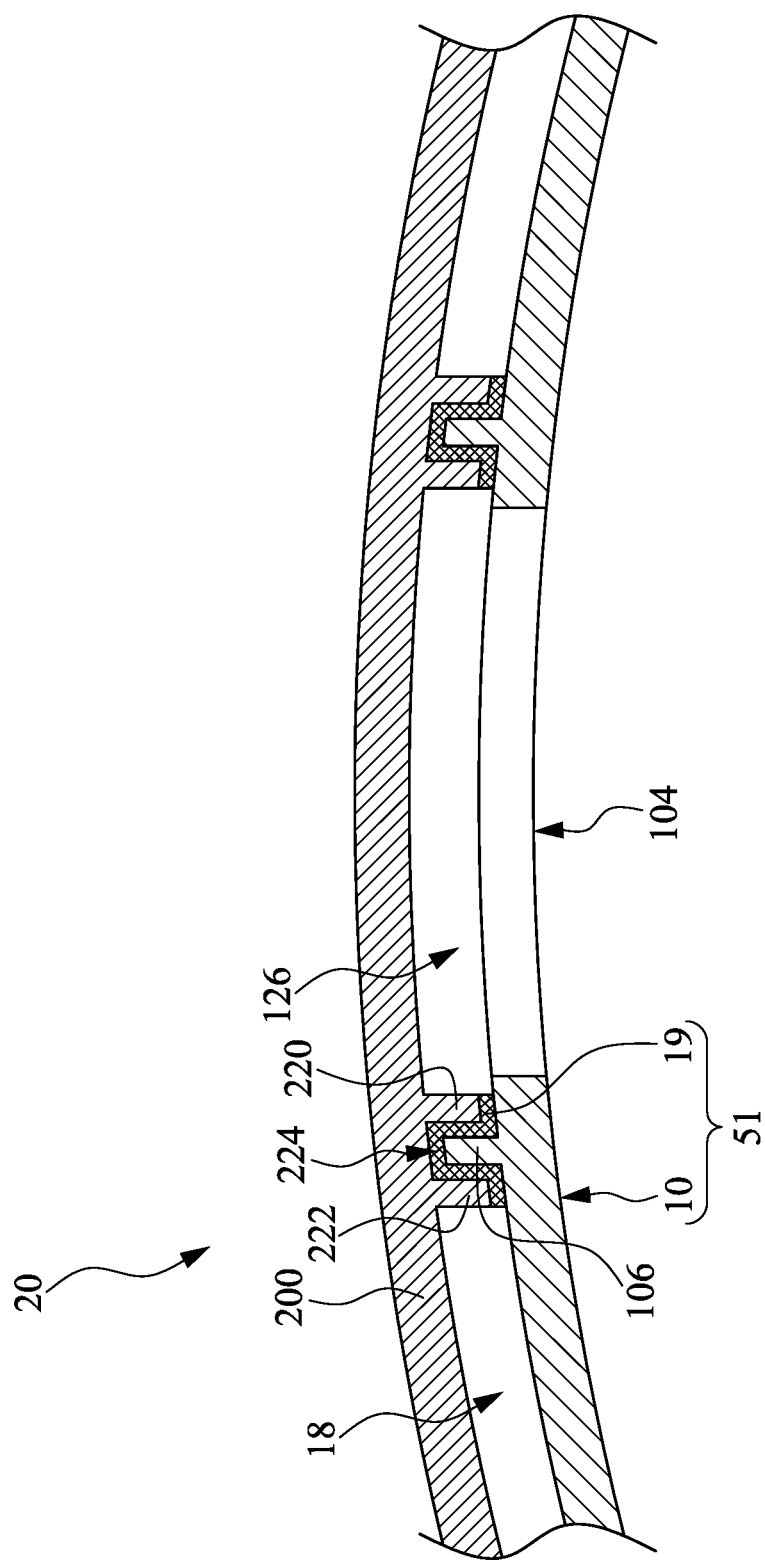

Reference is made to FIG. 8. FIG. 8 is a cross section view of the storage compartment 20 and a fender assembly 51 of another vehicle in accordance with some embodiments of the present disclosure. In FIG. 8, the structure and function of the elements and the relationship therebetween are substantially the same as the storage compartment 20 and the fender assembly 11 in FIG. 5, and the related detailed descriptions may refer to the foregoing paragraphs, and are not discussed again herein. It is noted that, the difference between the present embodiment and that in FIG. 5 is in that the fender assembly 51 further includes a bonding material 19.

Specifically, the bonding material 19 is at least disposed between the first engaging protrusion 106 of the fender 10 and the second and third engaging protrusions 220, 222 of the bottom plate 200 of the storage compartment 20. As such configuration, the groove defined by the second and third engaging protrusions 220, 222 is embedded with the first engaging protrusion 106 of the fender 10, such that the first engaging protrusion 106 of the fender 10 is joined with the groove 224, so as to increase the degree of closeness to each other to prevent water from leaking into the channel 18.

In some embodiments, the bonding material 19 is able to be disposed between the first engaging protrusion 106 of the fender 10 and the second engaging protrusion 220 of the bottom plate 200. Alternatively, the bonding material 19 is able to be disposed between the first engaging protrusion 106 of the fender 10 and the third engaging protrusion 222 of the bottom plate 200.

In the embodiment, the bonding material is made of rubber, but the present disclosure is not limited thereto. In the embodiment, the first engaging protrusion 10 is integrally formed with the fender 10, and the second and third engaging protrusions 220, 222 are integrally formed with the bottom plate 200 of the storage compartment 20, but the present disclosure is not limited thereto. In some embodiments, the first engaging protrusion 106, the second engaging protrusion 220, and the third engaging protrusion 222 are made of rubber or soft material, but the present disclosure is not limited thereto. In some embodiments, any suitable material can be used in this disclosure.

According to the foregoing recitations of the embodiments of the disclosure, it can be seen that the fender assembly is able to prevent water from splashing interior components of the vehicle 1 and from causing damage to related components. Specifically, the through hole of the fender allows the rear wheel of the vehicle to partially pass through the fender, thereby enabling the rear wheel to increase its radial size. On the other hand, when the vehicle is in a running state, the rear wheel movably protrudes from the through hole in a direction toward the bottom plate, or leaves the through hole in a direction away from the bottom plate without colliding or rubbing against the fender, so as to avoid instability of the vehicle during operation. Furthermore, through the arrangement of the through hole, the spaces on both sides of the fender is able to be connected, so as to extend a space adjacent to a side of the inner surface to another space adjacent to a side adjacent to the outer surface, such that the tolerance of components disposed in the space is able to be increase. For example, in the case where the through hole is provided in the fender, the selection of the size or shape of the rear wheel and the selection of the size or capability of the shock absorber (not shown) adjacent to the rear wheel of the vehicle will thus increase compared to the case where the fender is not provided with a through hole.

Moreover, when water is thrown by a centrifugal force of the rear wheel of the vehicle toward the fender, a part of water will be stop at the inner surface of the fender, and another part of water will pass through the through hole of the fender to the limiting space. Then, water in the limiting space is blocked by the surrounding second engaging protrusion, the first engaging protrusion, the third engaging protrusion, and/or the bottom plate of the storage compartment, and thus will at least partially flow back through the through hole to a side adjacent to the inner surface of the fender to limit water leakage to the channel. However, even if wafer flows through the second engaging protrusion, the first engaging protrusion, and the third engaging protrusion to the channel, the passing water is guided by the first retaining wall and/or the second retaining wall and exhaust channel from the diversion opening, thereby preventing water from splashing interior components of the vehicle and from causing damage to related components.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A fender assembly, comprising:
a fender having an inner surface, an outer surface, and a through hole connecting the inner surface to the outer surface;
a lid of a storage compartment located at an upper side of the outer surface and at least covering the through hole of the fender; and
a first retaining wall disposed at a first side of the outer surface and surrounding at least a portion of the through hole of the fender, wherein the first retaining wall at least partially forms a shrinking structure for changing a direction of a fluid on the upper side of the outer surface.

2. The fender assembly of claim 1, wherein the inner surface of the fender recesses toward the outer surface to form a recessing space, and the through hole is located at a bottom of the recessing space away from an outer edge of the fender.

3. The fender assembly of claim 1, wherein the through hole of the fender is a long slot having first and second long borderlines, the first long borderline being spaced apart from the second long borderline, and wherein the first retaining wall extends in a direction substantially parallel to the first long borderline.

4. The fender assembly of claim 3, wherein the first retaining wall comprises first and second extending portions connected to each other, the first extending portion is disposed on the first side, and the second extending portion extends from the first side to a second side of the fender opposite the first side.

5. The fender assembly of claim 4, wherein the long slot has first and second terminals located at opposite ends thereof respectively and each disposed between the first and second long borderlines, and wherein the fender has a lower edge proximal to the first terminal and distal to the second terminal, and wherein the second extending portion of the first retaining wall is disposed between the long slot and the lower edge.

6. The fender assembly of claim 1, further comprising a second retaining wall disposed on the outer surface and located at a second side of the fender.

7. The fender assembly of claim 1, wherein the first retaining wall comprises first, second, and third extending portions, and wherein the first extending portion is located at the first side of the fender, and wherein the second extending portion extends toward a second side of the fender from the first side, and wherein the third extending portion forms the shrinking structure with a second retaining wall at the second side of the fender.

8. The fender assembly of claim 6, wherein the lid, the outer surface of the fender, and the first and second retaining walls form a channel.

9. The fender assembly of claim 1, wherein the fender comprises a first engaging protrusion connected to a periphery of the through hole thereof, and the lid comprises a second engaging protrusion surrounding at least a part of the first engaging protrusion to join with the fender.

10. The fender assembly of claim 9, further comprising a bonding material disposed between the first engaging protrusion and the second engaging protrusion.

11. The fender assembly of claim 9, wherein the lid further comprises a third engaging protrusion to define a groove with the second engaging protrusion, and the first engaging protrusion of the fender is protruded in the groove.

12. The fender assembly of claim 11, wherein the first engaging protrusion is embedded in the groove.

* * * * *